(12) United States Patent
Kosaka et al.

(10) Patent No.: US 8,706,311 B2
(45) Date of Patent: Apr. 22, 2014

(54) ELECTRIC POWER DEMAND/SUPPLY PLANNING APPARATUS AND METHOD FOR THE SAME

(75) Inventors: Yoko Kosaka, Nakano-ku (JP);
Takenori Kobayashi, Meguro-ku (JP);
Yoshiki Murakami, Yokohama (JP);
Hideo Kusano, Fuchu (JP)

(73) Assignee: Kabushiki Kaisha Toshiba, Minato-ku, Tokyo (JP)

( * ) Notice: Subject to any disclaimer, the term of this patent is extended or adjusted under 35 U.S.C. 154(b) by 386 days.

(21) Appl. No.: 13/188,931

(22) Filed: Jul. 22, 2011

(65) Prior Publication Data

US 2012/0109393 A1    May 3, 2012

(30) Foreign Application Priority Data

Jul. 28, 2010 (JP) ................. P2010-169636

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G05B 11/01 | (2006.01) |
| G01R 21/00 | (2006.01) |
| G01R 21/06 | (2006.01) |
| G05F 3/00 | (2006.01) |
| G05F 3/02 | (2006.01) |
| B23K 11/24 | (2006.01) |

(52) U.S. Cl.
USPC ............. 700/291; 700/22; 700/286; 700/295; 700/297; 702/60; 702/61; 702/62; 323/234; 323/299; 323/304; 323/318

(58) Field of Classification Search
USPC ........ 700/22, 286, 291, 295, 297; 702/60–62; 323/234, 299, 304, 318
See application file for complete search history.

(56) References Cited

U.S. PATENT DOCUMENTS 5,347,466 A * 9/1994 Nichols et al. .................. 703/18
6,512,966 B2 * 1/2003 Lof et al. ...................... 700/291
(Continued)

FOREIGN PATENT DOCUMENTS

| CN | 101401403 A | 4/2009 |
|---|---|---|
| JP | 2010-020442 | 1/2010 |
| JP | 2010-213477 | 9/2010 |

OTHER PUBLICATIONS

Komukai, et al., "*Electric Power System Engineering*"; Maruzen Publishing Co., Sep. 1999, Chapter 9, pp. 127-141.

(Continued)

*Primary Examiner* — Ramesh Patel
(74) *Attorney, Agent, or Firm* — Ohlandt, Greeley, Ruggiero & Perle, L.L.P.

(57) ABSTRACT

An electric power planning apparatus is provided. The apparatus has an initial plan creating section, a generation amount probability density distribution creating section, an economic load dispatch calculating section, and a display section. The initial plan creating section creates an initial plan based on a demand predicted value, a predicted value of a natural energy electric power source power generation output amount, and electric power source equipment data. The generation amount probability density distribution creating section creates a probability density distribution using fluctuation bands of the demand and of the natural energy electric power source power generation output amount. The economic load dispatch calculating section calculates an output allocation based on the initial plan and the probability density distribution to create a prediction distribution of a power generation output of the controllable electric power source. The display section displays the prediction distribution.

16 Claims, 10 Drawing Sheets

(56) References Cited

U.S. PATENT DOCUMENTS

| | | | |
|---|---|---|---|
| 7,058,522 B2* | 6/2006 | Chen | 702/60 |
| 7,085,660 B2* | 8/2006 | Mansingh et al. | 702/60 |
| 7,243,044 B2* | 7/2007 | McCalla | 702/182 |
| 8,069,077 B2* | 11/2011 | Iino et al. | 705/7.31 |
| 2004/0257858 A1* | 12/2004 | Mansingh et al. | 365/154 |
| 2004/0264083 A1* | 12/2004 | Mansingh et al. | 361/62 |
| 2005/0015283 A1* | 1/2005 | Iino et al. | 705/4 |
| 2009/0037123 A1* | 2/2009 | Noujima et al. | 702/60 |
| 2010/0106332 A1* | 4/2010 | Chassin et al. | 700/278 |
| 2010/0114387 A1* | 5/2010 | Chassin | 700/286 |

OTHER PUBLICATIONS

Ministry of Economy, Trade, and Inudstry; "*Building-Up of Low-Carbon Power Suply System*"; Jul. 2009, 119 pages.

Chinese Office Action with English Translation dated Dec. 3, 2013 from corresponding Chinese Patent Application No. 201110222709.2, 14 pages.

\* cited by examiner

$$F = \sum_{t=1}^{T} \sum_{i=1}^{M} [F_i(P_i(t), u_i(t))]$$

$$= \sum_{t=1}^{T} \sum_{i=1}^{M} [u_i(t) f_i(P_i(t)) + s_t u_i(t)\{1 - u_i(t-1)\}]$$

···FORMULA (1)

FIG. 10

$$f_i(p) = C_f(a_i + b_i p_i + c_i p_i^2)$$ ···FORMULA (2)

$$s_i = d_i + e_i \tau$$ ···FORMULA (3)

FIG. 11

$$D(t) = \sum_{i=1}^{M} P_i(t)$$ ···FORMULA (4)

$$u_i(t) P_{MIN,i} \leq P_i(t) \leq u_i(t) P_{MAX,i}$$ ···FORMULA (5)

$$D(t)(1+R) \leq \sum_{i=1}^{M} u_i(t) P_{MAX,i}$$ ···FORMULA (6)

FIG. 12

$$Ft = \sum_{i=1}^{N} F(P_i) = \sum_{i=1}^{N} \left\{ a_i (P_i)^2 + b_i P_i + C_i \right\}$$

···FORMULA (7)

FIG. 13

$$0 = P_i - D_i - \sum_{j}^{N} \frac{\delta_i - \delta_j}{x_{ij}} \quad (i = 1, 2, \cdots, N)$$ ···FORMULA (8)

xij : REACTANCE OF EACH POWER TRANSMISSION LINE
$\delta_i$, $\delta_j$ : PHASE ANGLE OF EACH POWER TRANSMISSION LINE END $$-Cp \leq \frac{\delta_i - \delta_j}{x_{ij}} \leq Cp$$ ···FORMULA (9)

Cp: POWER TRANSMISSION LINE RATED CAPACITY

PHASE ANGLE OF REFERENCE BUS BAR = 0.0   ···FORMULA (10)

FIG. 14

$$\sum_{i=1}^{N} g_i P_i$$ ···FORMULA (11)

FIG. 15

$$\sum_{i=1}^{N} g_i P_i \leq Ei$$ ···FORMULA (12)

ELECTRIC POWER DEMAND/SUPPLY PLANNING APPARATUS AND METHOD FOR THE SAME

CROSS-REFERENCE TO RELATED APPLICATION

This application is based upon and claims the benefit of priority from the prior Japanese Patent Application No. 2010-169636, filed on Jul. 28, 2010; the entire contents of which are incorporated herein by reference.

FIELD

Embodiments described herein relate generally to an electric power demand/supply planning apparatus which displays an electric power demand/supply plan for an electric power system into which a natural energy electric power source is introduced and thereby supports evaluation, and to a method for the same.

BACKGROUND

In a demand/supply operation of an electric power system constituted only by an electric power source in which an electric power generation output is controllable such as conventional nuclear power generation and thermal power generation, a demand/supply plan is created as follows. That is, an electric power company calculates an output allocation in correspondence with an operation characteristic for each electric power generator of nuclear power generation, thermal power generation, or the like being an electric power source which is controllable in correspondence with a change of an estimated electric power demand. As a result, a demand/supply plan which maintains and secures a stable supply and an economical operation is created.

In recent years, in order to cope with global environmental problems or to promote utilization of non-fossil fuel, introduction of a natural energy electric power source such as solar power generation and wind power generation into an electric power system is promoted. Since a power generation output amount of such natural energy electric power sources significantly fluctuate by a change of weather, prediction is difficult. Thus, in a case that the electric power system into which the natural energy electric power source is introduced is an object, it is difficult to appropriately calculate an output allocation of a power generator being a controllable electric power source by a conventional method for creating a demand/supply plan.

In the natural energy electric power source, it is considered that numerous electric power sources such as a household solar power generation equipment and so on are installed not only in a bulk power system side but also in a power distribution system side. Since the power generation output of solar power generation changes depending on shining of the sun and weather, grasping a change is not easy. In addition, in solar power generation, there is a possibility that securing of a reserve power generation output (reserve power) and frequent changes of a current become necessary in order to prepare for a demand change.

In the above-described conventional method for creating the demand/supply plan, when a large amount of natural energy power sources are installed in the electric power system, it becomes difficult to appropriately calculate the output allocation of the power generator of the controllable power source due to a fluctuation of the power generation output of the natural energy electric power source. Further, there is a possibility that an electric power demand/supply plan created by the conventional method for creating the demand/supply plan cannot satisfy a constraint regarding a reserve power for preparing for a demand change and a constraint of a current change in which frequent changes of a current of a power transmission line is taken into consideration.

However, conventionally, it has been difficult to appropriately evaluate an electric power demand/supply plan created for an electric power system into which a natural energy electric power source is introduced, such as whether or not the electric power demand/supply plan created for the electric power system into which the natural energy electric power source is introduced satisfies the constraint regarding the reserve power and the constraint of the current change.

DETAILED DESCRIPTION

In one embodiment, an electric power demand/supply planning apparatus has an initial demand/supply plan creating section, a demand/power generation amount probability density distribution creating section, an economic load dispatch calculating section, and a display section. The initial demand/supply plan creating section creates an initial demand/supply plan of a controllable electric power source in an electric power system into which a natural energy electric power source is introduced, based on a demand predicted value, a predicted value of a natural energy electric power source power generation output amount, and electric power source equipment data. The demand/power generation amount probability density distribution creating section creates a probability density distribution of a demand and a probability density distribution of a natural energy electric power source power generation output amount at every predetermined processing time, by using fluctuation bands of a demand and of the natural energy electric power source power generation output amount which are set in advance. The economic load dispatch calculating section calculates an output allocation to minimize a total fuel cost of the controllable electric power source, based on the initial demand/supply plan created in the initial demand/supply plan creating section, the probability density distribution of the demand and the probability density distribution of the natural energy electric power source power generation output amount which are created in the demand/power generation amount probability density distribution creating section, thereby to create a prediction distribution of a power generation output of the controllable electric power source. The display section displays the prediction distribution of the power generation output of the controllable electric power source created in the economic load dispatch calculating section.

Hereinafter, embodiments will be concretely described with reference to the drawings.

(First Embodiment)

Figure 1:
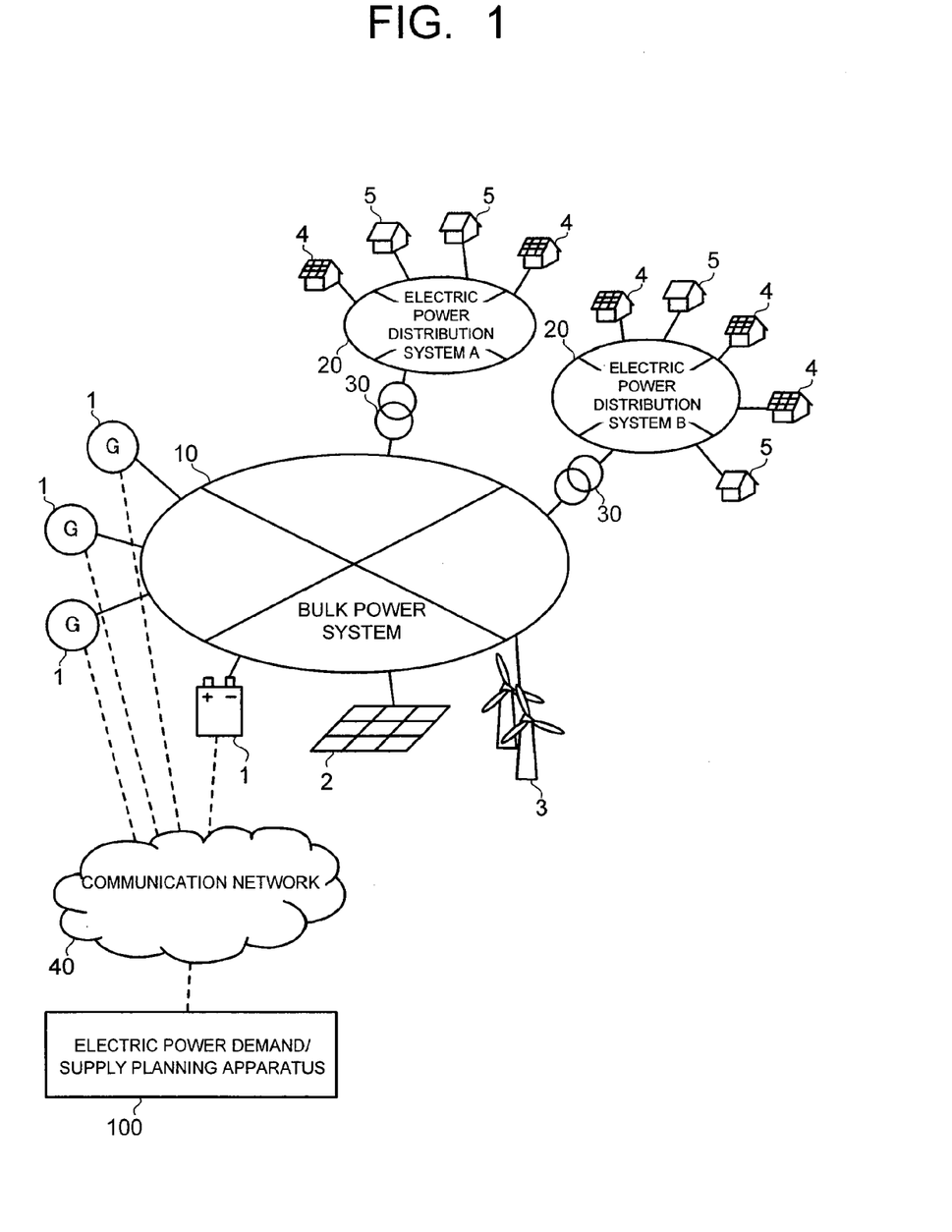
FIG. 1 is a diagram illustrating a configuration of an electric power system into which a natural energy electric power source of an embodiment is introduced.

A first embodiment will be described with reference to FIG. 1 to FIG. 6. FIG. 1 is a diagram illustrating a configuration of an electric power system into which a natural energy electric power source is introduced.

The electric power system is constituted by a bulk power system 10, an electric power distribution system 20, a distribution substation 30 which supplies an electric power from the bulk power system 10 to the electric power distribution system 20. To the bulk power system 10, a controllable electric power source 1, a large-scale solar power generation equipment (mega solar) 2, a wind power generation equipment 3 are connected. To the electric power distribution system 20, a customer 4 and a customer 5 are connected. The customer 4 has a household solar power generation equipment. The customer 5 does not have a power generation equipment. The controllable electric power source 1 includes, for example, not only electric power sources such as a nuclear power generator, a thermal power generator, and a hydraulic power generator, but also electric power sources which perform charging such as a pumping generator and a secondary battery. The large-scale solar power generation equipment 2, the wind power generation equipment 3, and the household solar power generation equipment of the customer 4 are natural energy electric power sources.

An electric power demand/supply planning apparatus 100 is installed in a manner to be able to communicate with the controllable electric power source 1 via a communication network 40.

Figure 2:
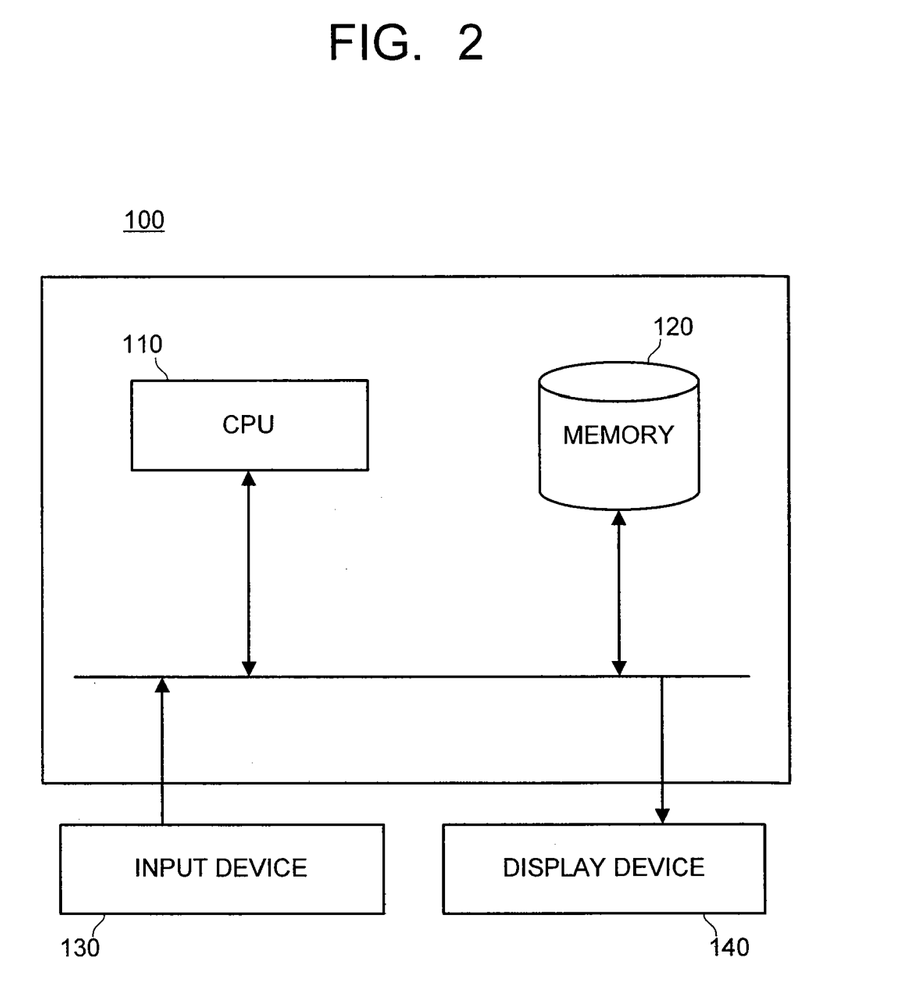
FIG. 2 is a diagram illustrating a hardware configuration of an electric power demand/supply planning apparatus of each embodiment.
Figure 3:
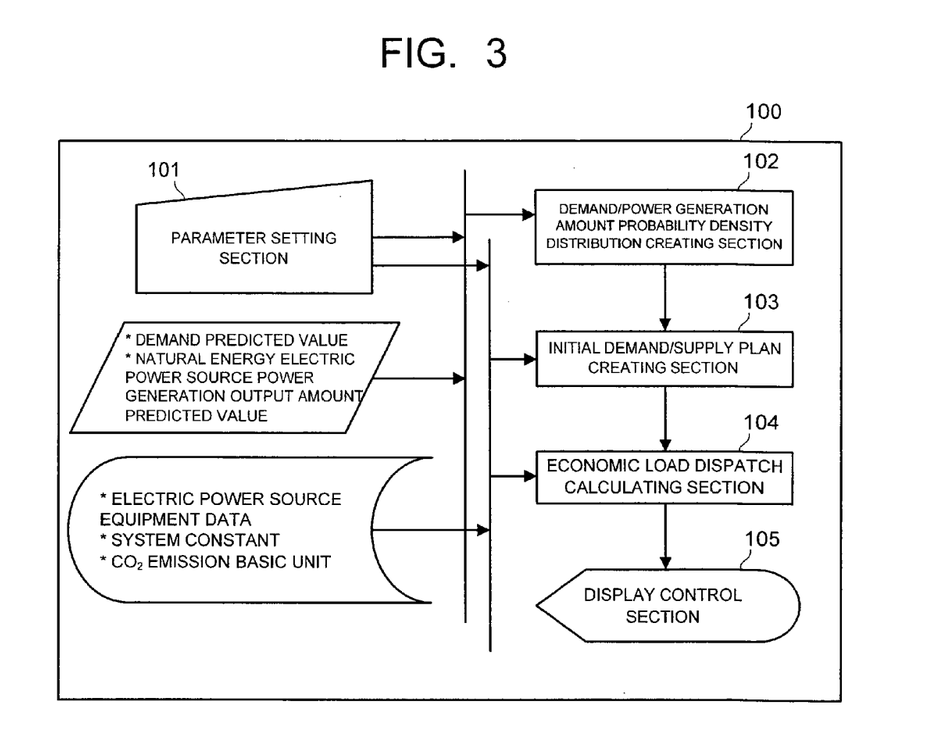
FIG. 3 is a functional block diagram illustrating a configuration of the electric power demand/supply planning apparatus of each embodiment.

FIG. 2 illustrates an example of a hardware configuration of an electric power demand/supply planning apparatus common to each embodiment. The electric power demand/supply planning apparatus 100 illustrated in FIG. 2 includes a CPU 110, a memory 120, an input device 130, and a display device 140. FIG. 3 illustrates a functional block diagram illustrating an example of a function of the electric power demand/supply planning apparatus common to each embodiment. As illustrated in FIG. 3, the electric power demand/supply planning apparatus 100 has a parameter setting section 101, a demand/power generation amount probability density distribution creating section 102, an initial demand/supply plan creating section 103, an economic load dispatch calculating section 104, and a display control section 105 (hereinafter, referred to as "parameter setting section 101 and so on"). Functions and processing procedures of those parameter setting section 101 and so on are stored in the memory 120 as a computer program. The CPU 110 reads the computer program stored in the memory 120 as necessary and executes the computer program, whereby the parameter setting section 101 and so on are realized.

Figure 4:
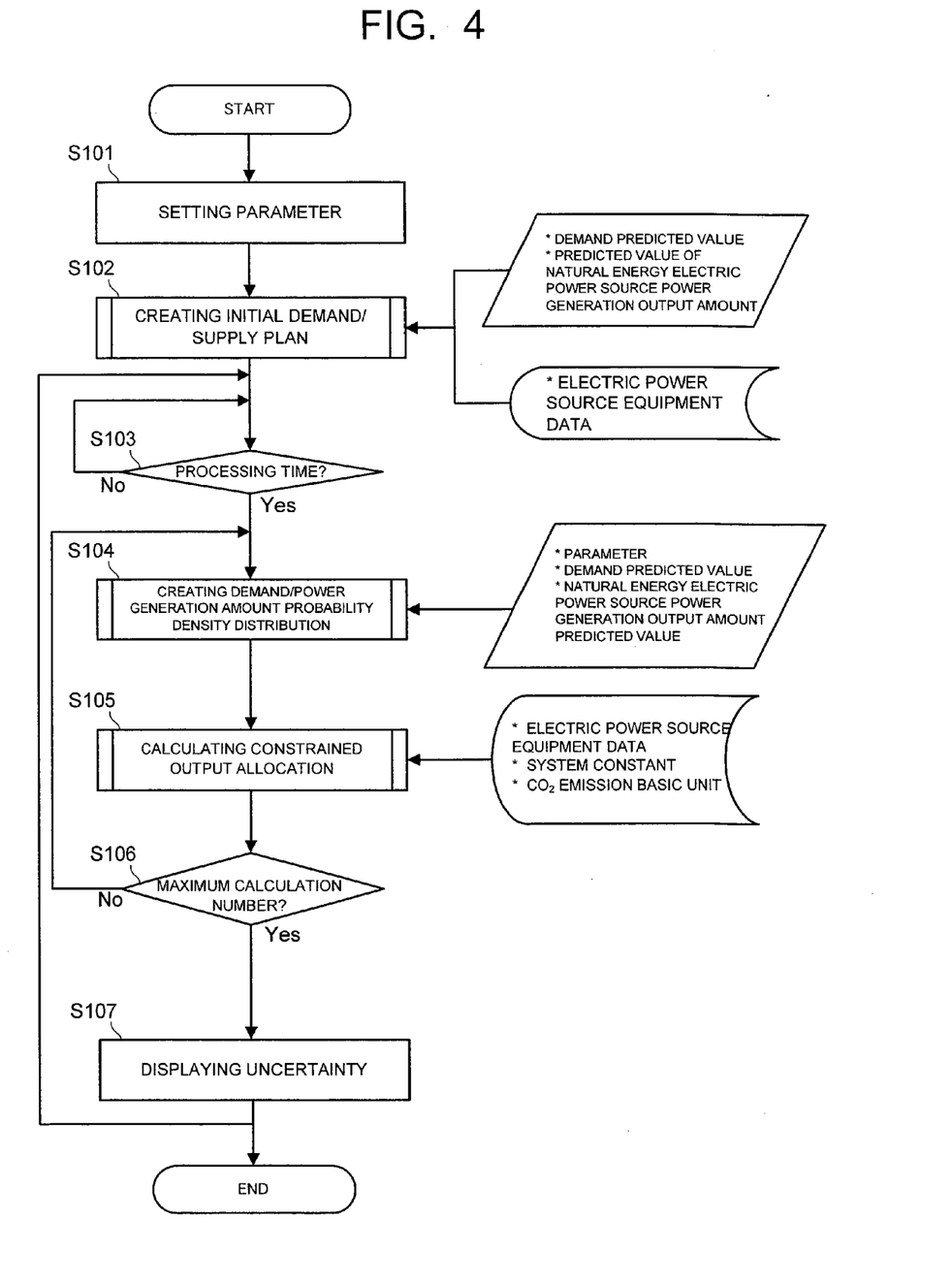
FIG. 4 is a flowchart illustrating an operation of the electric power demand/supply planning apparatus of each embodiment.

Next, an example of a concrete operation of the electric power demand/supply planning apparatus 100 according to the present embodiment will be described with reference to FIG. 4. FIG. 4 is a flowchart illustrating a processing procedure to display uncertainty of an electric power demand/supply plan created for an electric power system into which a natural energy electric power source is introduced.

First, the parameter setting section 101 executes a parameter setting step S101. The parameter setting section 101 sets, as parameters necessary for creating probability density distributions of demand/natural energy electric power source, a fluctuation band of a demand, a fluctuation band of a natural energy electric power source power generation output amount, a type of a probability density distribution function, and a calculation trial number. For example, as the parameter, the fluctuation band of the demand is set as a "standard deviation", the fluctuation band of the natural energy electric power source power generation output amount is set as a "standard deviation", the type of the probability density distribution function is set as a "normal distribution", and the calculation trial number is set as "10000". It should be noted that the parameter can be set at every processing time in a processing time judging step S103 described later.

Next, the initial demand/supply plan creating section 103 executes an initial demand/supply plan creating step S102. The initial demand/supply plan creating section 103 creates an initial demand/supply plan for one day so that a total power generation cost of the controllable electric power source 1 is minimized, by using a demand predicted value, a predicted value of a natural energy power generation output amount, and electric power source equipment data. Here, the predicted value of the natural energy power generation output amount includes predicted values of respective power generation output amounts of the large-scale solar power generation equipment 2, the wind power generation equipment 3, and the household solar power generation equipment of the customer 4. The electric power source equipment data is data regarding each equipment of the controllable electric power source 1 and includes data of a power generation output ability of a generator, a power generation cost, and so on. It should be noted that the electric power source equipment data is stored in the memory 120 of the electric power demand/supply planning apparatus 100 in advance. Further, the demand predicted value and the predicted value of the natural energy electric power source power generation output amount are obtained from a central power feeding instruction center (not shown) by the initial demand/supply plan creating section 103.

Figure 9:
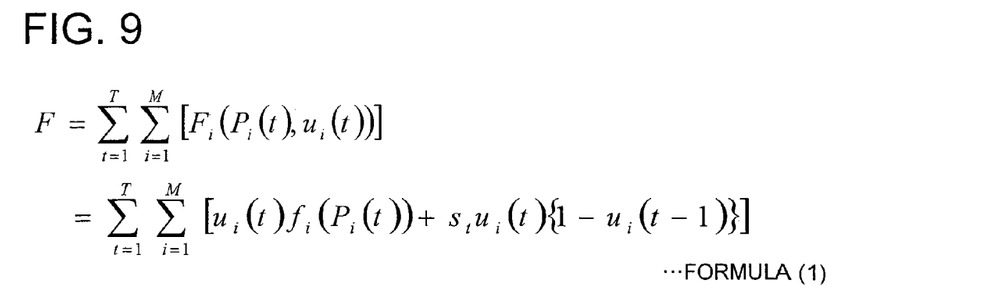
FIG. 9 to FIG. 15 are tables representing mathematical expressions used in the embodiments.

When an output at a discrete time (t=1, ..., T) of each electric power source (i=1, ..., M) of the controllable electric power source 1 is "Pi (t)" and a variable indicating a state of start (=1) and stop (=0) is "ui (t)", a total power generation cost F of the controllable electric power source 1 is represented by a formula (1) shown in FIG. 9. Here, the discrete time is, for example, a time with an interval of 60 minutes, and is "1 o'clock, 2 o'clock, 3 o'clock, ..., 23 o'clock, 24 o'clock".

Figure 10:
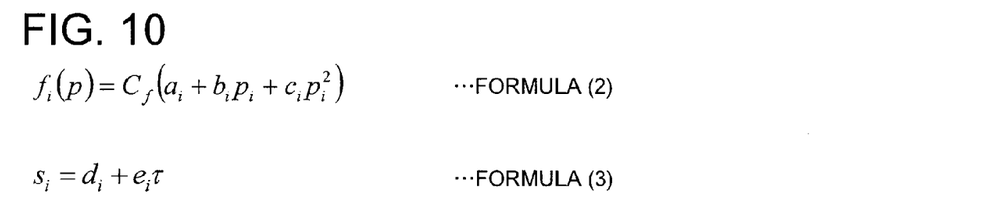

Here, a fuel cost fi (p), a start cost si are represented by a formula (2) and a formula (3) of FIG. 10, respectively. "Cf" indicates a thermal unit price (¥/MJ) of fuel, "τ" indicates an operation stop period, "ai", "bi", "ci", "di", and "ei" indicate electric power source parameters (outputs at the discrete times (t=1, ..., T) of the respective electric power sources (i=1, ..., M) of the controllable electric power source 1).

Figure 11:
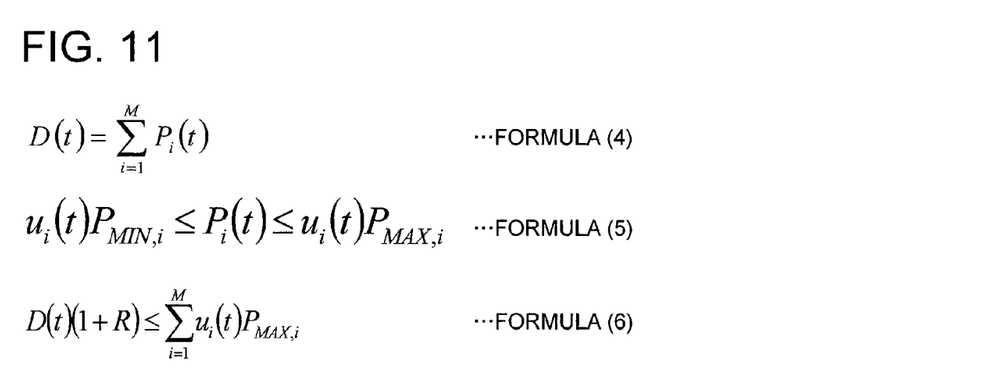

The initial demand/supply plan creating section 103 finds a solution to minimize the total power generation cost of the formula (1) so that a demand/supply balance, an electric power source maximum output, an electric power source minimum output, and a reserve power are satisfied as constraint conditions, and thereby the initial demand/supply plan for one day regarding the controllable electric power source 1 is created. Thereby, the initial demand/supplyplan at each of the discrete time of "1 o'clock, 2 o'clock, 3 o'clock, . . . , 23 o'clock, 24 o'clock" is obtained. A formula (4) to a formula (6) of FIG. 11 represent a "demand/supply balance for total demand D (t) at time t", an "electric power source maximum output PMAX, electric power source minimum output PMIN", and a "reserve power R", respectively.

After execution of the step S102, every time a present time is judged to have become a predetermined processing time decided in advance by a step S103, a step S104 to a step S107 are executed. Here, the processing time is a time the same as the discrete time t in the above-described initial demand/supply plan creating step S102, and is, for example, "1 o'clock, 2 o'clock, 3 o'clock, . . . , 23 o'clock, 24 o'clock".

In the step S103, the demand/power generation amount probability density distribution creating section 102 judges whether or not it has become the processing time. The demand/power generation amount probability density distribution creating section 102, when judging that the present time has become the processing time, executes a demand/power generation amount probability density distribution creating step S104.

In the step S104, the demand/power generation amount probability density distribution creating section 102 creates a probability density distribution of a demand at the processing time judged in the step S103 and a probability density distribution of the natural energy electric power source power generation output amount at the processing time judged in the step S103, by a Monte Carlo method. This creation is based on the parameters (fluctuation bands (for example, "standard deviations σ" of the demand and the natural energy electric power source power generation output amount) which the parameter setting section 101 sets in the parameter setting step S101, the type of the probability density distribution function (for example, "normal distribution"), the demand predicted value at the processing time judged in the step S103, and the predicted value of the natural energy electric power source power generation output amount.

For example, if, in the step S103, it is judged that the present time has become the processing time of "1 o'clock", in the step S104 the demand/power generation amount probability density distribution creating section 102 creates a probability density distribution of the demand at "1 o'clock" and a probability density distribution of the natural energy electric power source power generation output amount at "1 o'clock" by the Monte Carlo method based on the parameter which the parameter setting section 101 sets in the parameter setting step S101, a demand predicted value at "1 o'clock" and a predicted value of the natural energy electric power source power generation output amount. Similarly, if, in the step S103, it is judged that the present time has become the processing time of "2 o'clock", in the steps S104 the demand/power generation amount probability density distribution creating section 102 creates a probability density distribution of the demand at "2 o'clock" and a probability density distribution of the natural energy electric power source power generation output amount at "2 o'clock", by the Monte Carlo method based on the parameter which the parameter setting section 101 sets in the parameter setting step S101, a demand predicted value at "2 o'clock" and a predicted value of the natural energy electric power source power generation output amount. If the present time also becomes the processing time after "3 o'clock", a similar processing to that of the above-described "1 o'clock" and "2 o'clock" is performed.

Figure 5A:
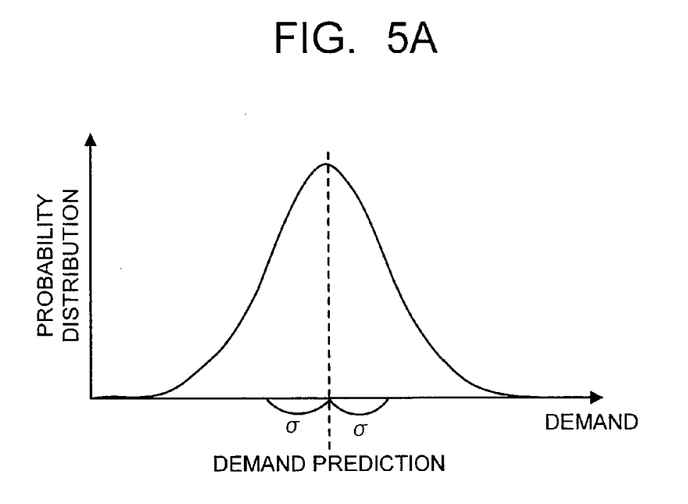
FIG. 5A and FIG. 5B are graphs representing examples of a probability density distribution of a demand and a probability density distribution of a natural energy electric power source power generation output amount, respectively.
Figure 5B:
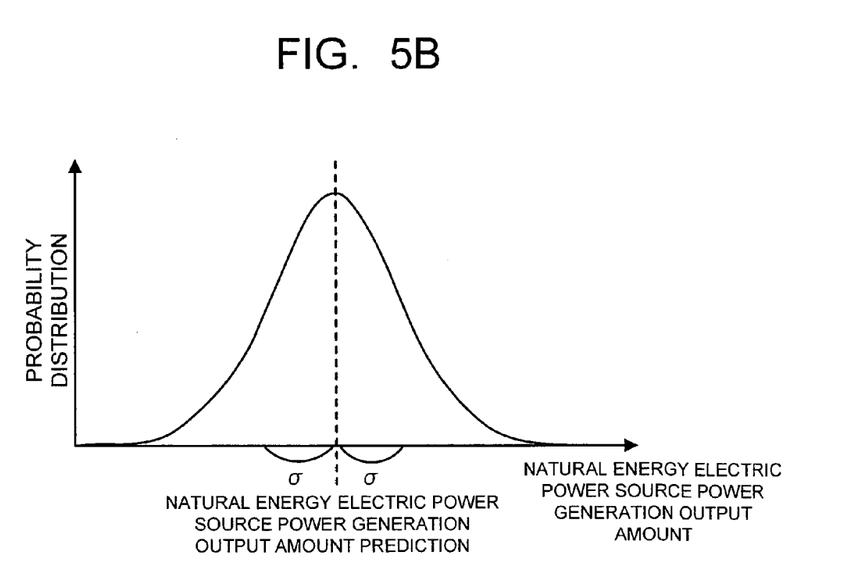

FIG. 5A represents an example of the probability density distribution of the demand which the demand/power generation amount probability density distribution creating section 102 creates. FIG. 5B represents an example of the probability density distribution of the natural energy electric power source power generation output amount which the demand/power generation amount probability density distribution creating section 102 creates.

The probability density distributions of the demand and of the natural energy electric power source power generation output amount each represented in FIG. 5A and FIG. 5B are created by the Monte Carlo method based on the demand predicted value and the predicted value of the natural energy electric power source power generation output amount. On this occasion, it is assumed that demand prediction data and the predicted value of the natural energy electric power source power generation output amount are average values and follow a normal deviation having the fluctuation band (in this example, it is assumed that the standard deviation a is set) which is set in the parameter setting step S101, and random numbers of the number corresponding to a calculation trial number set in the parameter setting step S101 is used. It should be noted that the probability density distribution is not limited to the normal deviation.

Next, the economic load dispatch calculating section 104 executes a constrained output allocation calculating step S105. The economic load dispatch calculation section 104 calculates an output allocation of an electric power source for minimizing the total fuel cost of the electric power source. The electric power source to be an object thereof is the electric power source ($i=1, \ldots, N$) in a start state ($ui(t)=1$) among the controllable power source 1 in the initial demand/supply plan for one day which the initial demand/supply plan creating section 103 creates. For such calculation, there are used electric power source equipment data, a system constant, a $CO_2$ emission basic unit, the probability density distributions of the demand at the processing time and of the natural energy electric power source power generation output amount at the processing time which are created in the demand/power generation amount probability density distribution creating section 102, and the initial demand/supply plan of the time corresponding to the processing time judged in the step S103 among the respective initial demand/supply plans at the discrete times which the initial demand/supply plan creating section 103 creates.

The output allocation of the electric power source calculated here is the output allocation of the controllable electric power source 1 at the processing time which is judged in the step S103. The total fuel cost Ft of the controllable electric power source 1 is represented by a formula (7) of FIG. 12.

Figure 12:
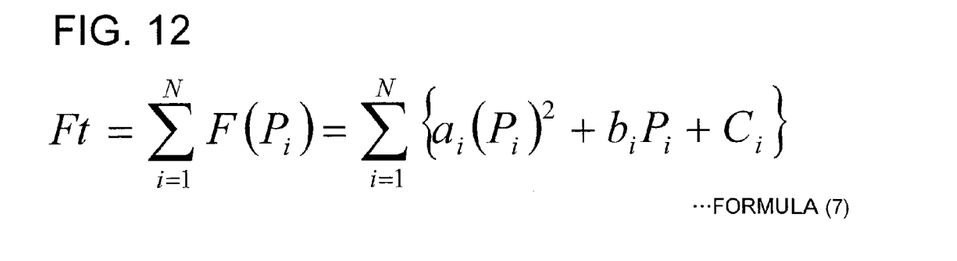

Here, "Pi" indicates an output at a discrete processing time ($t=1, \ldots, T$) of each electric power source ($i=1, \ldots, M$) of the controllable electric power source 1, and "ai", "bi", and "ci" indicate electric power source parameters.

In other words, the economic load dispatch calculating section 104 finds a solution to minimize the total fuel cost of the formula (7) so that the demand/supply balance (formula (4)) at the processing time, the electric power source maximum output/minimum output (formula (5)), and a reserve power (formula (6)) are satisfied as constraint conditions, and thereby the output allocation of the controllable electric power source 1 is calculated. It should be noted that the electric power source equipment data, the system constant, and the $CO_2$ emission basic unit are stored in the memory 120 of the electric power demand/supply planning apparatus 100 in advance.

Next, the economic load dispatch calculating section 104 judges whether or not a calculation number of the output allocation has reached the calculation trail number (for example, "10000") set by the parameter setting section 101 (step S106). As a result of the judgment, if the economic load dispatch calculating section 104 judges that the calculation trial number is not reached (No in a step S106), the demand/power generation amount probability density distribution creating step S104 and the constrained output allocation calculating step S105 are executed again. As described above, the demand/power generation amount probability density distribution creating step S104 and the constrained output allocation calculating step S105 are repeateduntil the calculation trial number is judged to be reached in the step S106. The demand/power generation amount probability density distribution creating step S104 and the constrained output allocation calculating step S105 are repeated for the calculation trial number. As a result, a prediction distribution of the power generation output of each electric power source of the controllable electric power source 1 is obtained in the economic load dispatch calculating section 104.

If, in the step S106, the economic load dispatch calculating section 104 judges that the calculation trial number is reached ("Yes" in the step S106), it proceeds to an uncertainty displaying step S107. In the uncertainty displaying step S107, the display control section 105 displays information such as the prediction distribution of the power generation output of each electric power source of the controllable electric power source 1 obtained in the economic load dispatch calculating section 104, in the display device 140. The information displayed in the display device 140 is information indicating uncertainty due to an output fluctuation of a natural energy electric power source included in an electric power demand/supply plan created for a controllable electric power source equipment in an electric power system in which the natural energy electric power source exists.

Figure 6:
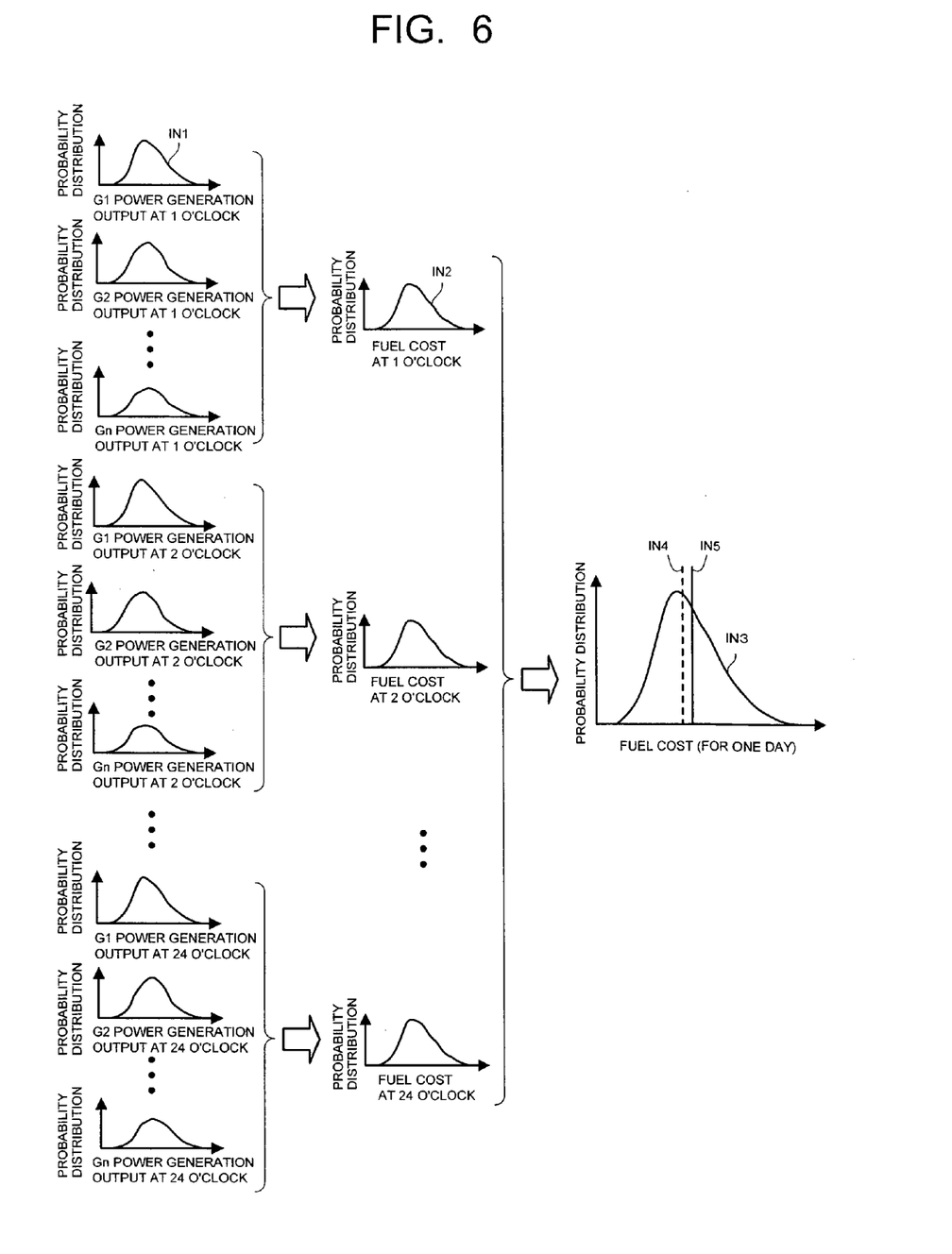
FIG. 6 is a diagram illustrating an example of information indicating uncertainty due to an output fluctuation of a natural energy electric power source included in an electric demand/supply plan.

FIG. 6 represents an example of the information indicating uncertainty to be displayed in the display device 140. As represented in FIG. 6, for example, following information IN1 to IN4 are displayed. Further, information IN5 is also displayed. The information IN1 to IN3 can be represented as a graph having an vertical axis and a horizontal axis, and the information IN4 and IN 5 can be represented as a line segment indicating a position of the horizontal axis in the graph.

IN1: "prediction distribution of power generation output of each electric power source of controllable electric power source 1" obtained in economic load dispatch calculating section 104.

IN2: "prediction distribution of fuel cost at every processing time of controllable electric power source 1" obtained from prediction distribution of power generation output of each electric power source IN3: "total fuel cost for one day of controllable electric power source 1" obtained from prediction distribution of fuel cost at every processing time.

IN4: "total fuel cost of controllable electric power source 1" calculated in initial demand/supply plan IN 5: expected value of prediction distribution of total fuel cost As described above, the information indicating uncertainty such as "prediction distribution of power generation output of each electric power source of controllable electric power source 1" is displayed in the display device 140. As a result, a user can easily grasp uncertainty due to an output fluctuation of a natural energy electric power source (fluctuation in a natural energy electric power source power generation output amount) included in an electric power demand/supply plan created for a controllable electric power source equipment in an electric power system in which the natural energy electric power source exists. Further, an output fluctuation of the natural energy electric power source is given regarding a specific processing time, and the user can easily grasp a degree of influence to a total fuel cost for one day of the controllable electric power source 1. Thus, it becomes possible that the user appropriately evaluates an electric power demand/supply plan for an electric power system into which a natural energy electric power source is introduced.

(Second Embodiment)

Next, a second embodiment will be described. A configuration of an electric power demand/supply planning apparatus of the second embodiment is the same as that of the first embodiment illustrated in FIG. 2 and FIG. 3.

Figure 13:
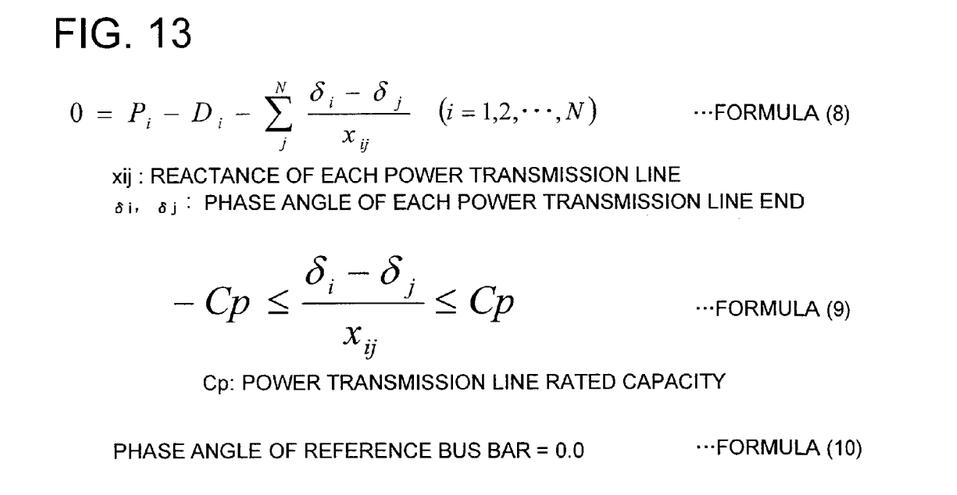

In the second embodiment, in a constrained output allocation calculating step S105 of FIG. 4, an economic load dispatch calculating section 104 calculates a predicted value of a current of a power transmission line in addition to an output allocation of a controllable electric power source 1. In this calculation, a solution to minimize a total fuel cost (formula (7)) so that in addition to a demand/supply balance at a processing time (formula (4)), an electric power source maximum output/minimum output (formula (5)), and a reserve power (formula (6)), further, a second constraint of the demand/supply balance, a power transmission capacity constraint, and a phase angle constraint of a reference bus bar are satisfied as constraint conditions. formula (8) to a formula (10) of FIG. 13 represent "second constraint of demand/supply balance", "electric power source maximum output/minimum output", and "phase angle constraint of reference bus bar", respectively.

A demand/power generation amount probability density distribution creating step S104 and the constrained output allocation calculating step S105 are repeated for a calculation trial number. As a result, in the economic load dispatch calculating section 104, in addition to the "prediction distribution of power generation output of each electric power source of controllable electric power source 1", a "prediction distribution of current of power transmission line" is obtained. In an uncertainty displaying step S107, a display control device 105 displays, in addition to the "prediction distribution of power generation output of each electric power source of controllable electric power source 1" , the "prediction distribution of current of power transmission line" in a display device 140.

As described above, in the second embodiment, the "prediction distribution of current of power transmission line" in which a constraint occurs by a fluctuation of the natural energy electric power source power generation output amount is displayed. As a result, a user can easily grasp influence of a fluctuation of the natural energy electric power source power generation output amount in relation to a power generation output and a total fuel cost of each electric power source of the controllable electric power source 1 in a case that a capacity constraint of the power transmission line is considered. Thus, it becomes possible that the user appropriately evaluates an electric power demand/supply plan for an electric power system into which a natural energy electric power source is introduced.

(Third Embodiment)

Figure 7:
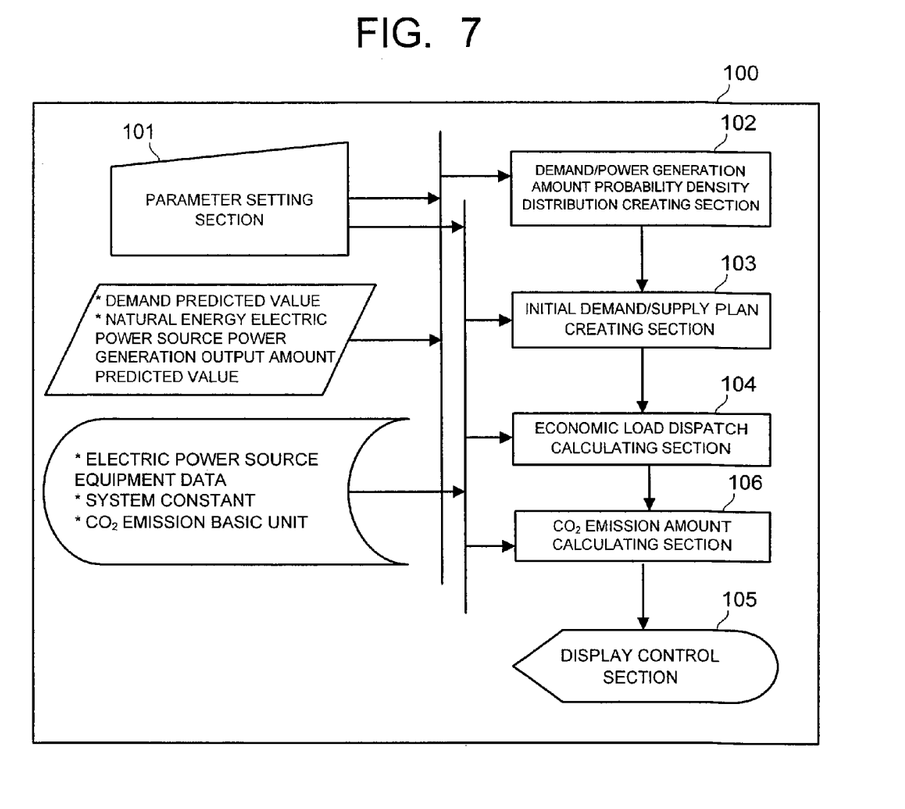
FIG. 7 is a functional block diagram illustrating a configuration of an electric power demand/supply planning apparatus of a third embodiment.
Figure 8:
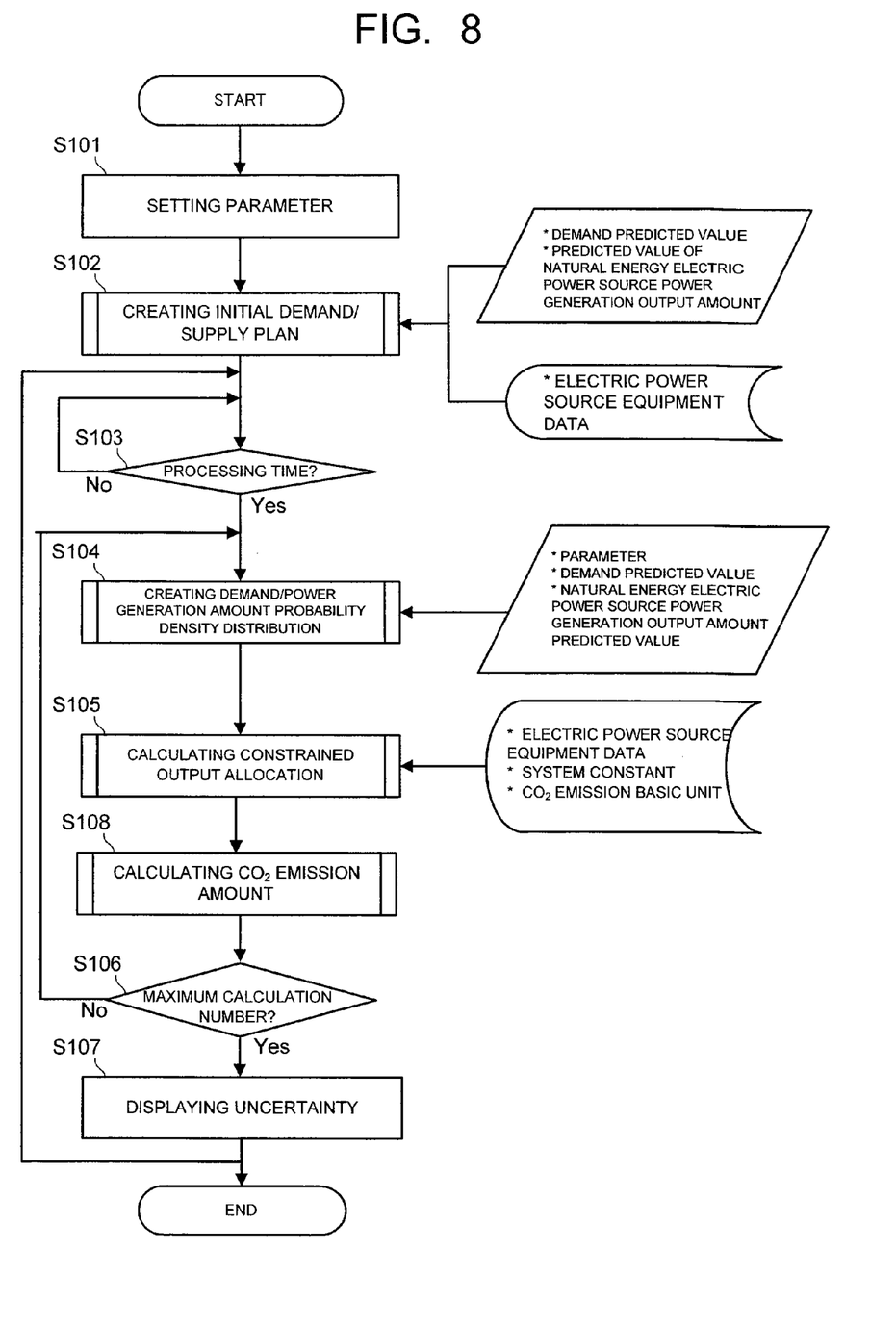
FIG. 8 is a flowchart illustrating an operation of the electric power demand/supply planning apparatus of the third embodiment.

Next, a third embodiment will be described with reference to FIG. 7 and FIG. 8. As illustrated in FIG. 7, an electric power demand/supply planning apparatus of the third embodiment has a $CO_2$ emission amount calculating section 106 added to the electric power demand/supply planning apparatus of the first embodiment. Further, as illustrated in FIG. 8, the electric power demand/supply planning apparatus of the third embodiment further performs a $CO_2$ emission amount calculating step S108, compared with the first embodiment.

Figure 14:
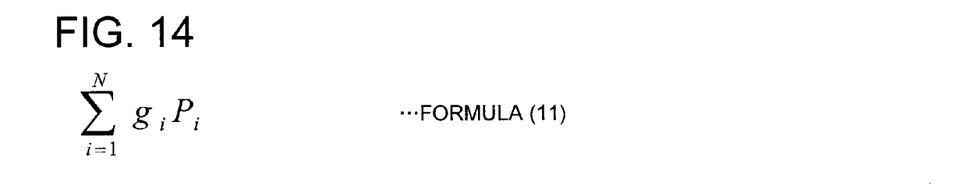

In the $CO_2$ emission amount calculating step S108, the $CO_2$ emission amount calculating section 106 calculates a $CO_2$ emission amount emitted from each electric power source of a controllable electric power source 1 and a total $CO_2$ emission amount being a total amount thereof. In this calculation, by using a formula (11) of FIG. 14, a power generation output of each electric power source of the controllable electric power source 1 calculated in an economic load dispatch calculating section 104 is multiplied by a $CO_2$ emission basic unit gi regarding each electric power source of the controllable electric power source 1.

A demand/power generation amount probability density distribution creating step S104, a constrained output allocation calculating step S105, and the $CO_2$ emission amount calculating step S108 are repeated for a calculation trial number. As a result, in the $CO_2$ emission amount calculating section 106, a "prediction distribution of $CO_2$ emission amount of each electric power source of controllable electric power source 1" and a "prediction distribution of total $CO_2$ emission amount of controllable electric power source 1" are obtained.

In an uncertainty displaying step S107, a display control section 105 displays in a display device 104 following information 1) and 2) in a manner to be comparable with following information 3) to 6).

1) "prediction distribution of $CO_2$ emission amount of each electric power source of controllable electric power source 1"

2) "prediction distribution of total $CO_2$ emission amount of controllable electric power source 1"

3) "prediction distribution of power generation output of each electric power source of controllable electric power source 1" obtained from calculation result of economic load dispatch calculating section 104

4) "prediction distribution of fuel cost at every processing time of controllable electric power source 1"

5) "total fuel cost for one day of controllable electric power source 1"

6) "total fuel cost of controllable electric power source 1" calculated in initial demand/supply plan.

As described above, in the third embodiment, the information 1) and 2) are displayed and a user can perform comparative evaluation with the information 3) to 5) and so on. Thus, it becomes possible that the user appropriately evaluates an electric power demand/supply plan for an electric power system into which a natural energy electric power source is introduced.

(Fourth Embodiment)

Next, a fourth embodiment will be described. A configuration of an electric power demand/supply planning apparatus of the fourth embodiment is the same as that of the first embodiment illustrated in FIG. 2 and FIG. 3.

Figure 15:
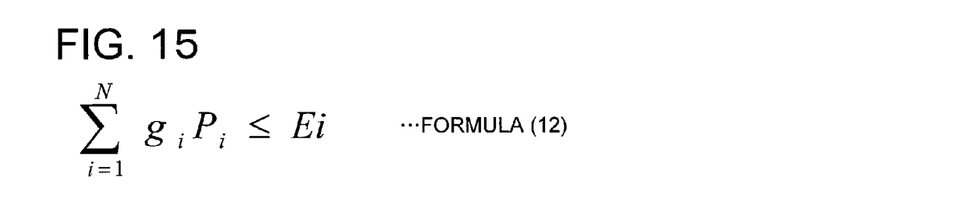

In the fourth embodiment, in a constrained output allocation calculating step S105 of FIG. 4, an economic load dispatch calculating section 104 finds a solution to minimize a total fuel cost (formula (7)) so that a $CO_2$ emission amount (formula (12) of FIG. 15) which a controllable electric power source 1 emits is satisfied as a constraint condition and thereby an output allocation of each electric power source of the controllable electric power source 1 is calculated.

A demand/power generation amount probability density distribution creating step S104 and a constrained output allocation calculating step S105 are repeated for a calculation trial number. As a result, in an economic load dispatch calculating section 104, a "prediction distribution of power generation output of each electric power source of controllable electric power source 1 satisfying constraint condition of $CO_2$ emission amount" is obtained.

In an uncertainty displaying step S107, a display control section 105 displays following information 1) to 3) in a display device 140.

1) "prediction distribution of power generation output of each electric power source of controllable electric power source 1 which satisfies constraint condition of $CO_2$ emission amount"

2) "prediction distribution of fuel cost at every processing time of controllable electric power source 1 which satisfies constraint condition of $CO_2$ emission amount" obtained from above prediction distribution of power generation output of each electric power source 3) "total fuel cost for one day of controllable electric power source 1 which satisfies constraint condition of $CO_2$ emission amount" obtained from above prediction distribution of fuel cost at every processing time As described above, in the fourth embodiment, under uncertainty of a power generation output amount of a natural energy electric power source, with regard to the power generation output of each electric power source of the controllable electric power source 1, an output allocation which maintains environmental friendliness in which a $CO_2$ emission amount is limited and which is good in economic efficiency is displayed, so that a user can easily have a grasp. Thus, it becomes possible that the user appropriately evaluates an electric power demand/supply plan for an electric power system into which a natural energy electric power source is introduced.

(Fifth Embodiment)

Next, a fifth embodiment will be described. A configuration of an electric power demand/supply planning apparatus of the fifth embodiment is the same as that of the first embodiment illustrated in FIG. 2 and FIG. 3.

In the fifth embodiment, in a constrained output allocation calculating step S105 of FIG. 4, an economic load dispatch calculating section 104 finds a solution to minimize a total $CO_2$ emission amount (formula (11)) so that a demand/supply balance (formula (4)), an electric power source maximum output minimum output (formula (5)), a reserve power constraint (formula (6)), a total fuel cost (formula (7)), a second constraint of demand/supply balance (formula (8)), a power transmission capacity constraint (formula (9)), and a phase angle constraint of a standard bus bar (formula (10) are satisfied as constraint conditions, and thereby an output allocation of a controllable electric power source 1 is calculated.

A demand/power generation amount probability density distribution creating step S104 and a constrained output allocation calculating step S105 are repeated for a calculation trial number. As a result, a "prediction distribution of power generation output of each electric power source of controllable electric power source 1 when total $CO_2$ emission amount is minimized" in which environmental friendliness is given priority is obtained in an economic load dispatch calculating section 104.

In an uncertainty displaying step S107, a display control section 105 displays, for example, following information in a display device 140.

1) "prediction distribution of power generation output of each electric power source of controllable electric power source 1 when total $CO_2$ emission amount is minimized"

2) "prediction distribution of fuel cost at every processing time of controllable electric power source 1 when total $CO_2$ emission amount is minimized" obtained from above "prediction distribution of power generation output of each electric power source of controllable electric power source 1 when total $Co_2$ emission amount is minimized"

3) "total fuel cost for one day of controllable electric power source 1 when total $Co_2$ emission amount is minimized" obtained from above "prediction distribution of fuel cost at every processing time of controllable electric power source 1 when total $Co_2$ emission amount is minimized"

Incidentally, in the constrained output allocation calculating step S105, as a result that the economic load dispatch calculating section 104 finds the solution to minimize a total $Co_2$ emission amount (formula (11)) so that a demand/supply balance (formula (4)), an electric power source maximum output/minimum output (formula (5)), a reserve power constraint (formula (6)), a total fuel cost (formula (7)), a second constraint of demand/supplybalance (formula (8)), apower transmission capacity constraint (formula (9)), and a phase angle constraint of a standard bus bar (formula (10) are satisfied as constraint conditions, the "prediction distribution of power generation output of each electric power source of controllable electric power source 1 when total $Co_2$ emission amount is minimized in which environmental friendliness is given priority" is obtained. Along therewith, it is possible that the economic load dispatch calculating section 104 finds a solution to minimize a total fuel cost (formula (7)) so that constraints of the same constraint conditions as the above (formula (5) to formula (10)) are satisfied, thereby to obtain a "prediction distribution of power generation output of each electric power source of controllable electric power source 1 when total $Co_2$ emission amount is minimized in which economic efficiency is given priority"

In this case, in the uncertainty displaying step S107, a display control section 105 displays following information 4) to 6) together with the following information 1) to 3) in a display device 140.

1) "prediction distribution of power generation output of each electric power source of controllable electric power source 1 when total $Co_2$ emission amount is minimized in which environmental friendliness is given priority"

2) "prediction distribution of fuel cost at every processing time of controllable electric power source 1 when total $Co_2$ emission amount is minimized in which environmental friendliness is given priority"

3) "total fuel cost for one day of controllable electric power source 1 when total $Co_2$ emission amount is minimized in which environmental friendliness is given priority"

4) "prediction distribution of power generation output of each electric power source of controllable electric power source 1 when total $Co_2$ emission amount is minimized in which economic efficiency is given priority"

5) "prediction distribution of fuel cost at every processing time of controllable electric power source 1 when total $Co_2$ emission amount is minimized in which economic efficiency is given priority"

6) "total fuel cost for one day of controllable electric power source 1 when total $Co_2$ emission amount is minimized in which economic efficiency is given priority"

As described above, in the fifth embodiment, under uncertainty of a power generation output amount of a natural energy electric power source, there are displayed various prediction distributions of an output allocation to minimize a $Co_2$ emission amount in which environmental friendliness is given priority and of an output allocation in which economic efficiency is given priority. As a result, it is constituted that a user can easily have a grasp and can perform comparative evaluation or an analysis. Thus, it becomes possible that the user appropriately evaluates an electric power demand/supply plan for an electric power system into which a natural energy electric power source is introduced.

(Sixth Embodiment)

A sixth embodiment will be described. A configuration of an electric power demand/supply planning apparatus of the sixth embodiment is the same as that of the first embodiment illustrated in FIG. 2 and FIG. 3.

In the sixth embodiment, in a parameter setting step S101 of FIG. 4, as parameters necessary for creating a probability density distribution of a demand/natural energy electric power supply, there are set, in addition to a fluctuation band of demand, a fluctuation band of the natural energy electric power source power generation output amount, a type of a probability density distribution function, and a calculation trial number, further, a correlation coefficient of a fluctuation among respective diversified electric power sources of the natural energy electric power source and a correlation coefficient of a fluctuation among the respective diversified electric power sources and customers. Further, in a demand/power generation amount probability density distribution creating step S104, a demand/power generation amount probability density distribution creating section 102 creates a probability density distribution of demand and a probability density distribution of a natural energy electric power source power generation output amount, based on the parameter including the correlation coefficient of the fluctuation among the respective diversified electric power sources of the natural energy electric power source and the correlation coefficient of the fluctuation among the respective diversified electric power sources and the customers which are set in the parameter setting section 101. A demand/power generation amount probability density distribution creating step S104 and the constrained output allocation calculating step S105 are repeated until it is judged that a calculation trial number is reached in a step S106. As a result, in the economic load dispatch calculating section 104, there is obtained a "prediction distribution of power generation output of each electric power source of controllable electric power source 1 in which fluctuation of natural energy electric power source output amount is simulated more realistically". This probability distribution is a probability distribution of a power generation output of each electric power source of a controllable electric power source 1 in which a fluctuation among respective diversified electric power sources of a natural energy electric power source and a fluctuation among the respective diversified electric power sources and customers are reflected.

In an uncertainty displaying step S107, a display control section 105 displays following information 1) to 3) and so on in a display device 140.

1) "prediction distribution of power generation output of each electric power source of controllable electric power source 1 in which fluctuation of natural energy electric power source output amount is simulated more realistically"

2) "prediction distribution of fuel cost for each processing time of controllable electric power source 1 in which fluctuation of natural energy electric power source output amount is simulated more realistically"

3) "total fuel cost for one day of controllable electric power source 1 in which fluctuation of natural energy electric power source output amount is simulated more realistically"

As described above, according to the sixth embodiment, there are displayed various prediction distributions in which a fluctuation of natural energy electric power source output amount is simulated more realistically, so that a user can easily have a grasp. Thus, it becomes possible that the user appropriately evaluates an electric power demand/supply plan for an electric power system into which a natural energy electric power source is introduced.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electric demand/supply planning apparatus, comprising:
   an initial demand/supply plan creating section which creates an initial demand/supply plan of a controllable electric power source in an electric power system into which a natural energy electric power source is introduced, based on a demand predicted value, a predicted value of a natural energy electric power source power generation output amount, and electric power source equipment data;
   a demand/power generation amount probability density distribution creating section which creates a probability density distribution of a demand and a probability density distribution of a natural energy electric power source power generation output amount at every predetermined processing time, by using fluctuation bands of the demand and of the natural energy electric power source power generation output amount which are set in advance;
   an economic load dispatch calculating section which calculates an output allocation to minimize a total fuel cost of the controllable electric power source based on the initial demand/supply plan created in the initial demand/supply plan creating section, the probability density distribution of the demand and the probability density distribution of the natural energy electric power source power generation output amount which are created in the demand/power generation amount probability density distribution creating section, thereby to create a prediction distribution of a power generation output of the controllable electric power source; and
   a display section which displays the prediction distribution of the power generation output of the controllable electric power source created in the economic load dispatch calculating section.

2. The electric power demand/supply planning apparatus according to claim 1,
   wherein the display section displays a prediction distribution of a fuel cost at every predetermined processing time of the controllable electric power source obtained from the prediction distribution of the power generation output of the controllable electric power source created in the economic load dispatch calculating section.

3. The electric power demand/supply planning apparatus according to claim 1,
   wherein the display section displays the total fuel cost of the controllable electric power source obtained from the prediction distribution of the power generation output of the controllable electric power source created in the economic load dispatch calculating section.

4. The electric power demand/supply planning apparatus according to claim 1,
   wherein the economic load dispatch calculating section creates a prediction distribution of a current of a power transmission line by calculating the output allocation to minimize the total fuel cost of the controllable electric power source so that a transmission capacity constraint is satisfied as a constraint condition.

5. The electric power demand/supply planning apparatus according to claim 1, further comprising:
   a $Co_2$ emission amount calculating section which creates a prediction distribution of a $Co_2$ emission amount of the controllable electric power source, by calculating a $Co_2$ emission amount of the controllable electric power source based on the power generation output of the controllable electric power source calculated in the economic load dispatch calculating section and a $Co_2$ emission basic unit regarding the controllable electric power source,
   wherein the display section displays the prediction distribution of the $Co_2$ emission amount of the controllable electric power source created by the $Co_2$ emission amount calculating section.

6. The electric power demand/supply planning apparatus according to claim 1,
   wherein the economic load dispatch calculating section creates the prediction distribution of the power generation output of the controllable electric power source by calculating an output allocation to minimize the total fuel cost of the controllable electric power source so that a constraint of the $Co_2$ emission amount which the controllable electric power source emits is satisfied.

7. The electric power demand/supply planning apparatus according to claim 1,
   wherein the economic load dispatch calculating section creates the prediction distribution of the power generation output of the controllable electric power source by calculating an output allocation to minimize the total $Co_2$ emission amount of the $Co_2$ which the controllable electric power source emits.

8. The electric power demand/supply planning apparatus according to claim 1,
   wherein the demand/power generation amount probability density distribution creating section creates a probability density distribution of a demand and a probability density distribution of a natural energy electric power source power generation output amount at every predetermined processing time, by using the fluctuation bands of the demand and of the natural energy electric power source power generation output amount which are set in advance, a correlation coefficient of a fluctuation among respective diversified electric power sources of natural energy electric power sources and a correlation coefficient of a fluctuation among the respective diversified electric power sources and customers.

9. A method for displaying an electric power demand/supply plan, comprising:
   creating an initial demand/supply plan of a controllable electric power source for an electric power system into which a natural energy electric power source is introduced, base on a demand predicted value, a predicted value of a natural energy electric power source power generation output amount, and electric power source equipment data;
   creating a probability density distribution of a demand and a probability density distribution of a natural energy electric power source power generation output amount at every predetermined processing time, by using fluctuation bands of the demand of the natural energy electric power source power generation output amount which are set in advance;

calculating an output allocation to minimize a total fuel cost of the controllable electric power source and creates a prediction distribution of a power generation output of the controllable electric power source, based on the created initial demand/supply plan, the created probability density distribution of the demand and probability density distribution of the natural energy electric power source power generation output amount, thereby to create a prediction distribution of a power generation output of the controllable electric power source; and displaying the created prediction distribution of the power generation output of the controllable electric power source.

10. The method for displaying the electric power demand/supply plan according to claim 9, wherein, in the displaying, a prediction distribution of a fuel cost at every predetermined processing time of the controllable electric power source obtained from the created prediction distribution of the power generation output of the controllable electric power source is displayed.

11. The method for displaying the electric power demand/supply plan according to claim 9, wherein, in the displaying, the total fuel cost of the controllable electric power source obtained from the created prediction distribution of the power generation output of the controllable electric power source is displayed.

12. The method for displaying the electric power demand/supply plan according to claim 9, wherein, in the creating the prediction distribution, a prediction distribution of a current of a power transmission line is created by calculating an output allocation to minimize the total fuel cost of the controllable electric power source so that a transmission capacity constraint is satisfied as a constraint condition.

13. The method for displaying the electric power demand/supply plan according to claim 9, further comprising:

creating a prediction distribution of a $Co_2$ emission amount of the controllable electric power source, by calculating a $Co_2$ emission amount of the controllable electric power source based on the power generation output of the controllable electric power source calculated in creating the prediction distribution and a $Co_2$ emission basic unit regarding the controllable electric power source, wherein, in the displaying, the prediction distribution of the $Co_2$ emission amount of the controllable electric power source is displayed.

14. The method for displaying the electric power demand/supply plan according to claim 9, wherein, in the creating the prediction distribution, the prediction distribution of the power generation output of the controllable electric power source is created by calculating an output allocation to minimize the total fuel cost of the controllable electric power source so that a constraint of the $Co_2$ emission amount which the controllable electric power source emits is satisfied.

15. The method for displaying the electric power demand/supply plan according to claim 9, wherein, in the creating the prediction distribution, the prediction distribution of the power generation output of the controllable electric power source is created by calculating an output allocation to minimize the total $Co_2$ emission amount of the $Co_2$ which the controllable electric power source emits.

16. The method for displaying the electric power demand/supply plan according to claim 9, wherein, in the creating the probability density distribution, the probability density distribution of a demand and a probability density distribution of a natural energy electric power source power generation output amount are created at every predetermined processing time, by using the fluctuation bands of the demand and of the natural energy electric power source power generation output amount which are set in advance, a correlation coefficient of a fluctuation among respective diversified electric power sources of natural energy electric power sources and a correlation coefficient of a fluctuation among the respective diversified electric power sources and customers.

* * * * *